B. O. P. OSSWALD
INVENTOR.

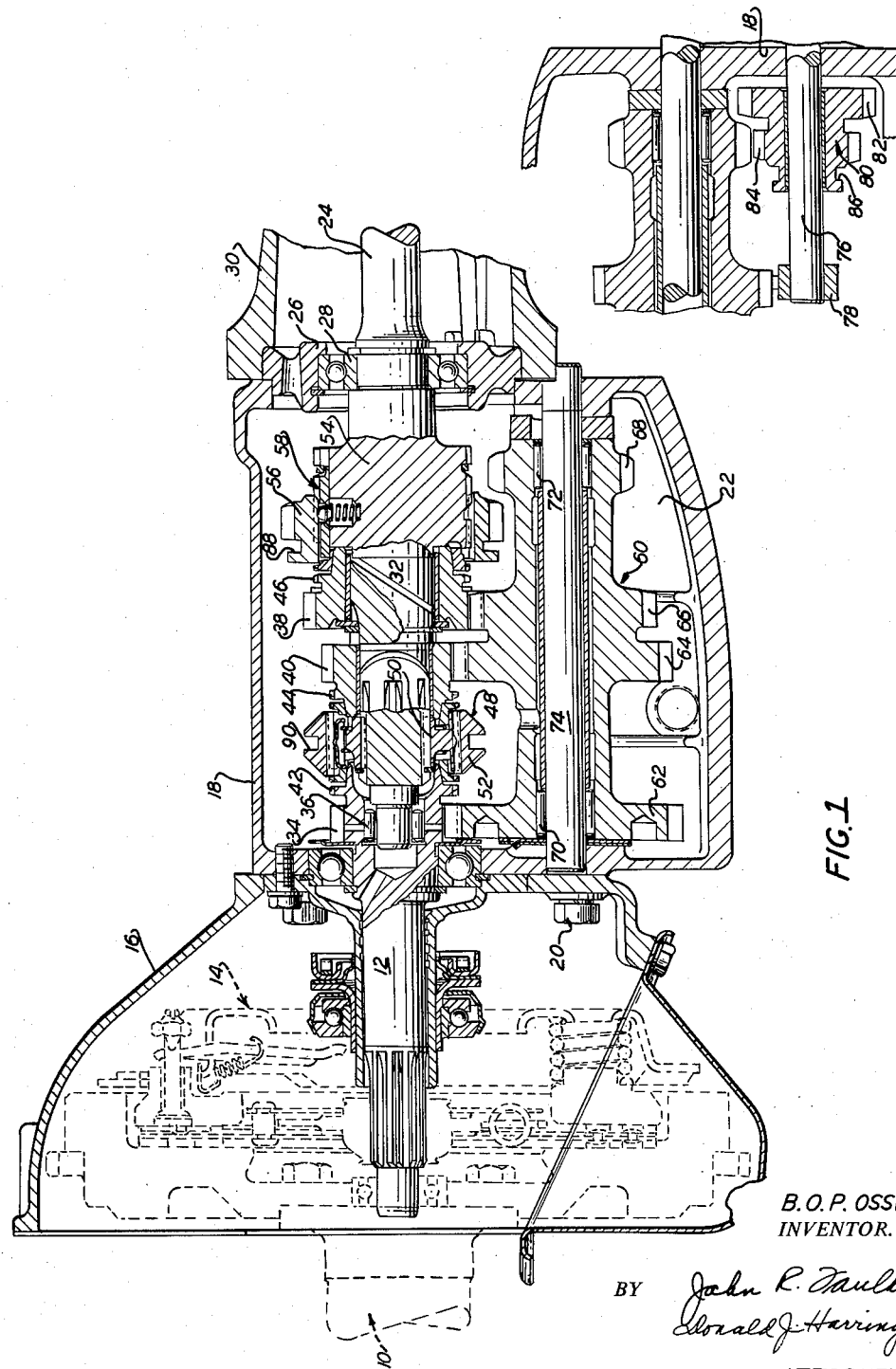

ATTORNEYS

June 26, 1962      B. O. P. OSSWALD      3,040,595
MULTIPLE SPEED POWER TRANSMISSION MECHANISM
Filed Nov. 27, 1959      7 Sheets-Sheet 3

B.O.P. OSSWALD
INVENTOR.

BY John R. Faulkner
Donald J. Harrington
ATTORNEYS

June 26, 1962  B. O. P. OSSWALD  3,040,595
MULTIPLE SPEED POWER TRANSMISSION MECHANISM
Filed Nov. 27, 1959  7 Sheets-Sheet 5

B. O. P. OSSWALD
INVENTOR.

BY John R. Faulkner
Donald J. Harrington
ATTORNEYS

June 26, 1962  B. O. P. OSSWALD  3,040,595
MULTIPLE SPEED POWER TRANSMISSION MECHANISM
Filed Nov. 27, 1959  7 Sheets-Sheet 6

B.O.P. OSSWALD
INVENTOR.

BY John P. Faulkner
Donald J. Harrington

ATTORNEYS

United States Patent Office 3,040,595
Patented June 26, 1962

3,040,595
MULTIPLE SPEED POWER TRANSMISSION
MECHANISM
Bernhard O. P. Osswald, Koln, Germany, assignor to Ford Motor Company, Dearborn, Mich., a corporation of Delaware
Filed Nov. 27, 1959, Ser. No. 855,631
Claims priority, application Germany Dec. 1, 1958
5 Claims. (Cl. 74—333)

This invention relates generally to power transmission mechanisms, and more particularly to a manually operated, multiple speed power transmission mechanism having synchronized speed ratio shifts.

I am aware of conventional three-speed transmission mechanisms having synchronized gears and a sliding gear which cooperate with a cluster gear assembly mounted for rotation about an axis parallel to the centerline of the power input and power output shafts. Separate gear portions of the cluster gear assembly are adapted to mesh with the power input gear, an intermediate speed gear and a low and reverse speed gear. The intermediate speed gear and the low and reverse speed gear are journaled rotatably on the transmission mainshaft which in turn is connected integrally to the power output shaft of the transmission. A synchronizer clutch mechanism can be used to lock selectively the intermediate speed gear to the mainshaft to effect intermediate speed drive and the same synchronizing clutch mechanism can be used to couple directly the power input shaft to the mainshaft. The low and reverse speed gear is a sliding gear that may be moved axially on the mainshaft into meshing engagement with a cooperating gear portion of the cluster gear assembly to effect low speed operation, and it may be moved in the opposite direction into meshing engagement with the reverse idler which in turn drivably engages in a continuous fashion a reverse gear portion of the cluster gear assembly. The transmission may thus be conditioned for reverse drive operation or for operation in any one of three forward drive gear ratios.

My instant invention embodies a four-speed gear arrangement and the physical construction of the component elements is patterned after the three-speed counterpart above described. However, the shift from neutral into the low speed ratio in such a three-speed transmission would correspond in the transmission of my instant invention to a shift from the low speed ratio to the second speed ratio.

In a conventional three-speed transmission the low and reverse gear may be shifted in one direction into meshing engagement with a reverse speed idler gear which in turn is engaged continuously with a reverse drive gear portion of the cluster gear assembly. Reverse drive may be accomplished in this fashion. When a corresponding shift of the low speed gear is made in the transmission of my instant invention, the sliding gear directly engages the low speed gear portion of the cluster gear assembly to condition the transmission for low speed operation. In my improved four-speed transmission, the reverse drive gear train is somewhat isolated from the gears used for obtaining the four forward speed ratios. The reverse drive gear train includes a reverse idler gear which may be shifted to establish a driving engagement between the low speed gear on the mainshaft and the low speed gear portion of the cluster gear assembly, and independent control means are provided for accomplishing such a shift into reverse drive range.

The isolation of the reverse speed gear mechanism and the shifting means for accomplishing a reverse drive shift makes it possible to simplify considerably the transmission design and to achieve a high degree of reliability in operation.

The provision of a transmission mechanism of the type above set forth being a principal object of my invention, it is a further object to provide a transmission having multiple forward speeds and one reverse speed wherein means are provided for preventing an inadvertent shift from a forward drive range to reverse drive range during forward motion of the vehicle.

It is a futher object of my invention to provide a four-speed transmission of the type above described wherein a gear shifting mechanism of the type currently used on conventional three-speed gear transmissions may be adopted with minor alterations.

It is a further object of my invention to provide a four-speed transmission of the type above set forth and which incorporates a high degree of interchangeability of parts with relation to conventional three-speed transmissions.

It is a further object of my invention to provide a four-speed transmission which lends itself to known manufacturing techniques.

In a conventional three-speed transmission a pair of shifting rods transfers the gear selecting movement of the shifting shaft to the gearbox, one shifting rod being provided for the first and reverse gear and the other being provided for the second and third gear. According to one embodiment of my invention, I have provided a linkage arrangement similar to that above described but which also incorporates a third shifting rod mechanically connected to a shifting fork for actuating the reverse idler gear.

According to a second embodiment of my invention, I have provided a linkage mechanism for operating the reverse gear which includes a push-pull cable or rod that acts against a spring, the latter normally urging the shifting fork of the reverse pinion toward a disengaged position. One end of the push-pull rod may be mounted within the driver compartment at a convenient location on the instrument panel or at any other desired location.

For the purpose of particularly describing my invention, reference will be made to the accompanying drawings wherein:

FIGURE 1 is a cross sectional assembly view of a four-speed power transmission mechanism embodying the improvements of my instant invention;

FIGURE 2 is a cross sectional subassembly view of a portion of the cluster gear assembly of FIGURE 1 and of the reverse idler pinion. The plane in which FIGURE 2 appears is out of position with respect to the plane of FIGURE 1;

Figure 3:
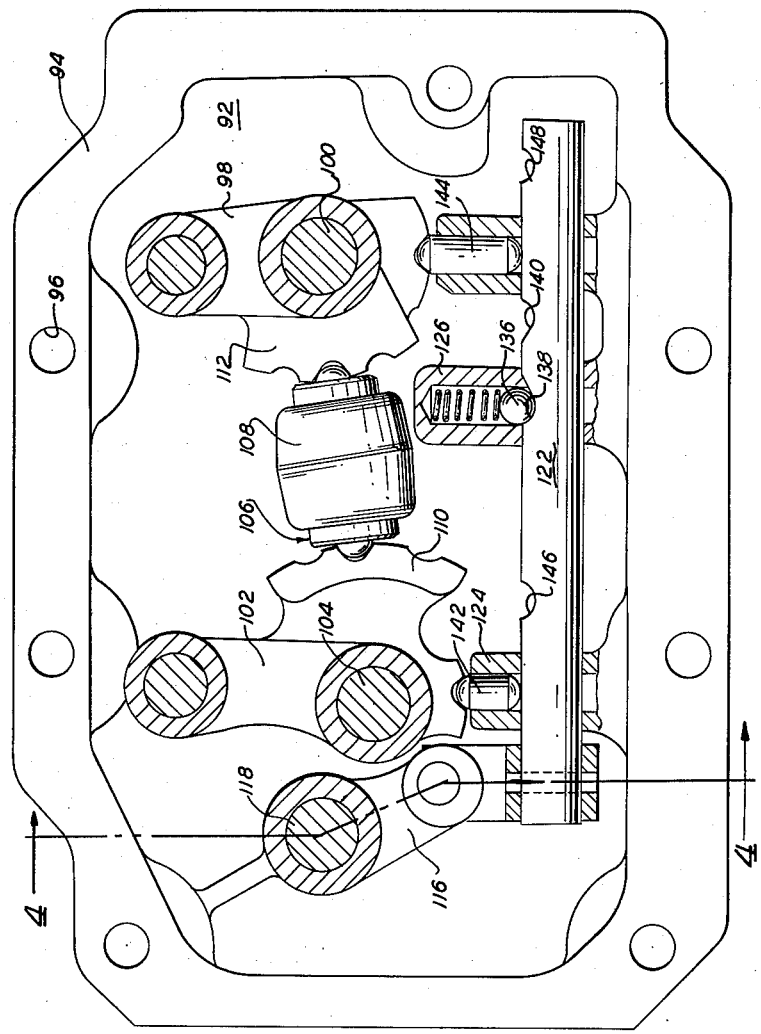
FIGURE 3 is a side elevation view partly in section of the inside of the transmission cover plate with the associated gear shifting elements.

Referring first to FIGURE 1, numeral 10 generally designates the engine crankshaft and numeral 12 generally designates the power input shaft of the power transmission mechanism. Crankshaft 10 may be connected to power input shaft 12 through a suitable clutch structure shown by means of phantom lines and identified by reference character 14. Clutch structure 14 is located within a clutch bell housing 16 which may be bolted to the cast engine block for a wheeled automotive vehicle.

Numeral 18 designates a main transmission housing which may be bolted at one end thereof to a cooperating flange on the housing 16, suitable bolts 20 being provided for this purpose. A transmission sump is situated at the lower end of the transmission housing 18 and is identified by reference character 22. A power output shaft is shown at 24 and it is journaled within a bearing support 26 joined to the rearward end of transmission housing 18. A ball bearing 28 is seated in bearing support 26 for the purpose of journaling shaft 24. A tailshaft housing 30 is secured to housing 18 and it extends rearwardly in surrounding relationship with respect to power output shaft 24.

Power output shaft 24 forms an extension of a so-called transmission mainshaft 32 extending through the transmission assembly in concentric relationship with respect to power input shaft 12 and power output shaft 24. The forward end of mainshaft 32 is reduced in diameter and is journaled within a power input gear 34 by means of pilot or journal bearings 36. Gear 34 is connected integrally to power input shaft 12. A second speed gear 38 is journaled rotatably by means of suitable bushings on mainshaft 32 as indicated, and a third speed gear 40 of somewhat smaller diameter is also journaled on mainshaft 32 adjacent gear 38. Each of the gears 34, 40 and 38 is formed with synchronizer clutch teeth as shown at 42, 44 and 46, respectively.

A first synchronizer mechanism is shown at 48 and it comprises a hub 50 splined to mainshaft 32. Hub 50 is externally splined to receive slidably thereon a clutch element 52. Clutch synchronizer teeth 42 or 44 may be engaged selectively by clutch element 52 when the latter is moved longitudinally in one direction or the other. When it is moved in a rearward direction, synchronizer clutch teeth 44 become engaged with clutch element 52 thereby locking gear 40 to mainshaft 32. In a similar fashion, when clutch element 52 is moved in a forward direction it becomes drivably engaged with synchronizer clutch teeth 42 thereby directly coupling power input shaft 12 to mainshaft 32.

A relatively large diameter synchronizer clutch hub is formed on mainshaft 32 as shown at 54 and it is externally splined for the purpose of slidably receiving thereon an internally splined low speed and reverse gear 56. A synchronizer mechanism, generally identified by reference character 58, is used for the purpose of providing synchronized engagement of the internal spline teeth for gear element 56 and the external synchronizer clutch teeth 46 on gear 38 to establish a driving connection between gear 38 and mainshaft 32. The transmission is so conditioned whenever operation in the second speed ratio is desired.

The transmission further includes a cluster gear assembly 60 and it comprises longitudinally spaced gear elements 62, 64, 66 and 68, each of which are formed as a part of an integral assembly that in turn is rotatably journaled by bearings 70 and 72 on a countershaft 74, the latter in turn being fixed to and carried by the lower portion of the transmission housing 18 in the region of sump 22. Power input gear 34 drivably engages in a continuous fashion gear 62; and similarly, gears 40 and 38 respectively engage gears 64 and 66.

The forward and reverse gear 56 may be moved in a rearward direction on hub 54 until it drivably engages gear 68 of the cluster gear assembly. When so positioned, the transmission is conditioned for operation in the lowest speed ratio.

It will be apparent from the foregoing that a sequential operation of the four forward speed ratios may be obtained. The first or lowest speed ratio may be obtained when gear 56 is moved into meshing engagement with gear 68 as previously mentioned. To obtain the next highest speed ratio, gear 56 is disengaged from gear 68 shown in FIGURE 1 and gear 38 is clutched to mainshaft 32 by means of the synchronizer clutch teeth 46 and the internal splined teeth on gear 56. To establish the third speed ratio, the gear 56 is returned to the position shown in FIGURE 1, and clutch element 52 is moved in a rearward direction so that synchronizer clutch teeth 44 will be engaged by internal spline teeth in clutch element 52, thereby locking gear 40 to mainshaft 32. Direct drive may be obtained, as previously mentioned, by moving clutch element 52 into clutching engagement with teeth 42.

Referring next to FIGURE 2, I have shown a second countershaft 76 which is secured to transmission housing 18 and to a supporting web 78. An engine reverse idler pinion 80 is journaled on countershaft 76, and it may be moved axially along shaft 76 by a suitable linkage mechanism which will subsequently be described. When it is shifted in a left-hand direction as viewed in FIGURE 2, a gear element 82 drivably engages gear 68 of the cluster gear assembly and a gear 84 drivably engages gear 56 on the mainshaft 32. When pinion 80 is shifted in this fashion, and when the synchronizer elements assume the position shown in FIGURE 1, the transmission is conditioned for reverse drive operation. Gear pinion 80 is formed with a grooved portion 86 to accommodate a shifting fork by means of which the shifting of pinion 80 may be effected. In a similar fashion, gear 56 is formed with a grooved portion 88 and clutch element 52 is formed with a grooved portion 90, said grooved portions 88 and 90 being adapted to cooperate with shifting forks for establishing the above-described shifting motion during speed ratio changes.

Figure 4:
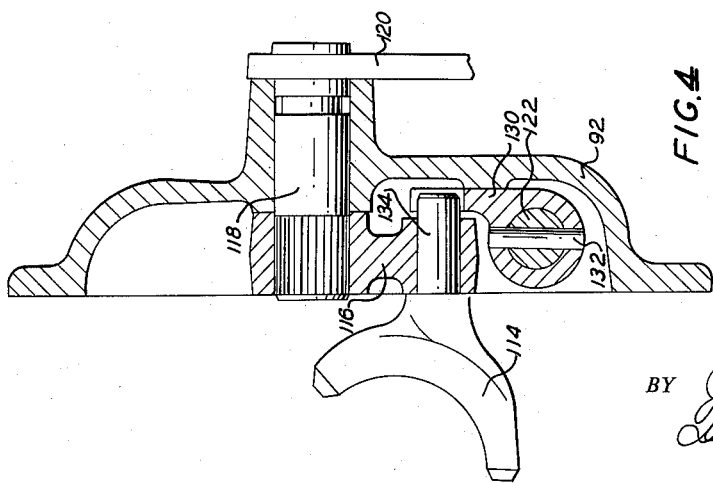
FIGURE 4 is a partial cross sectional view of a portion of the linkage elements of FIGURE 3 and is taken along section line 4—4 of FIGURE 3.

The shifting operation of the reverse idler pinion 80 may be isolated and the shifting operation of the reverse idler pinion and the mechanism for accomplishing such a shift may be isolated from the mechanism which is used for selectively obtaining the four forward drive ratios. This feature will be particularly described with reference to the other figures. A first reverse idler shifting mechanism is shown in FIGURES 3 and 4 and it comprises a transmission cover plate 92 which may be positioned over an opening in the side of the transmission housing 18. A peripheral flange 94 of cover plate 92 is adapted to cooperate with the mating flange on the transmission housing, and bolt holes 96 accommodate clamping bolts. A lever arm 98 is carried by a shaft 100 extending through the cover plate 92, and a suitable external lever is situated on the outer side of cover plate 92 for the purpose of rotating shaft 100 about its axis. Lever arm 98 carries a shifter fork for engaging groove 90 in clutch element 52 for moving the latter in either a forward or a rearward direction depending on the direction of rotation of shaft 100. In a similar fashion, a lever 102 is carried by a shaft 104 extending outwardly of the cover plate 92, and it carries a shifter fork at the upper end thereof for establishing forward and rearward movement of the above-described gear 56, said shifter fork being disposed within groove 88.

A lock plunger is generally identified by reference character 106 and it is suitably mounted within a bracket 108 carried by cover plate 92. The ends of lock plunger 106 are engageable with cam elements 110 and 112 connected respectively to levers 102 and 98. When shaft 100 is moved in a clockwise direction as viewed in FIGURE 3, the transmission is conditioned for direct drive operation and lock plunger 106 will be moved by cam 112 in a leftward direction thereby preventing any movement of lever 102. However, when lever 98 is returned again to the position shown in FIGURE 3, lock plunger 106 will again permit lever 102 to be rotated in either a clockwise or counterclockwise direction. When lever 98 is moved in a counterclockwise direction, the transmission is conditioned for third speed operation, and again the lock plunger 106 will inhibit movement of lever 102. These various positions of lever 98 are defined by appropriately spaced cam recesses in the cam element 112.

When lever 102 is shifted in a clockwise direction, the associated shifter fork will move gear 56 into the second speed ratio, and when it is moved in a counterclockwise direction as viewed in FIGURE 3, gear 56 is shifted into a first speed ratio position. When lever 102 is shifted in this fashion, lock plunger 106 is moved in a right-hand direction to inhibit movement of lever 98. The various operating positions for lever 102 are defined by appropriately spaced cam recesses formed in can element 110.

Movement of the reverse drive pinion is accomplished by means of a shifter fork identified in FIGURE 4 by reference character 114 carried by a lever arm 116 which in turn is splined to rotatable shaft 118. The shaft 118 extends outwardly from the cover plate 92 as indicated in FIGURE 4, and an external lever 120 may be used for rotatably adjusting shaft 118. Fork 114 is disposed in groove 86 of the reverse idler pinion 80.

A shifter shaft 122 is slidably mounted in suitable bosses 124, 126 and 128 in the transmission housing 18. One end of shifter shaft 122 carries an arm 130 which is secured to shaft 122 by means of a pin 132. Arm 130 includes an upwardly extending portion having a slot within which is positioned the shank 134 of shifter fork 114. When the lever 120 and lever arm 116 are rotated in a counterclockwise direction as viewed in FIGURE 3, shaft 122 is moved in a right-hand direction to the position indicated, and this position corresponds to the position in which detent ball 136 engages a detent recess 138 in shaft 122. Detent ball 136 is spring urged into engagement with recess 138 by means of a detent spring which is anchored on boss 126. When lever arm 116 is moved in the opposite direction, shaft 122 is moved until detent ball 136 engages recess 140.

When the transmission is conditioned for reverse drive, shaft 122 assumes the position shown in FIGURE 3 and levers 102 and 98 assume the neutral position indicated and the shifter fork 114 moves reverse idler pinion 80 in a forward direction so that the gear 84 engages gear 56 and gear 82 engages gear 68. When shaft 122 is so positioned, an interlock element 142 slidably carried by boss 124 is moved into locking engagement with a recess formed in cam element 110 so that the latter cannot be shifted in either direction from that shown in FIGURE 3. In a similar fashion, an interlock element 144 is urged in a forward direction into locking engagement with a recess formed in cam element 112 so that the lever 98 cannot be rotated in either direction from that shown in FIGURE 3. When the transmission is conditioned for reverse drive operation, it is therefore impossible to move clutch element 52 or gear 56 from the neutral position indicated in FIGURE 1.

When shifter shaft 122 is moved in a left-hand direction, as viewed in FIGURE 3, reverse idler pinion 80 is moved out of engagement with gears 56 and 68 and detent ball 136 engages recess 140. When this occurs, interlock elements 142 and 144 respectively engage recesses 146 and 148. Interlock elements 142 and 144 are then moved to an unlocking position to permit rotation of levers 102 and 98.

Figure 13:
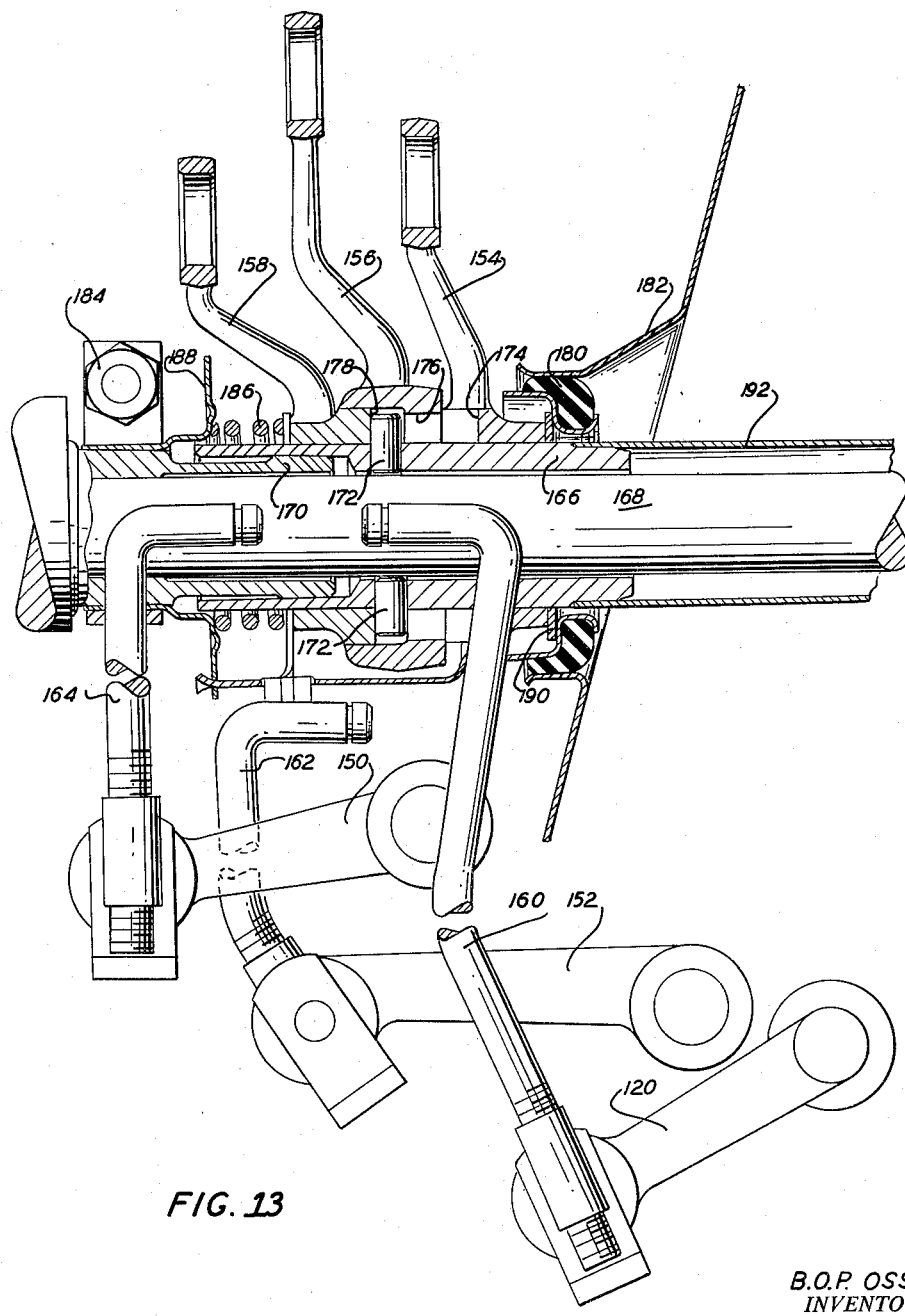
FIGURE 13 is a cross sectional view of the lower end of the steering wheel column showing the linkage connections between the gearshifting shaft and the linkage elements of the shifting mechanism.

Referring next to FIGURE 13, I have disclosed a linkage arrangement for moving the shifter forks for the reverse idler pinion for clutch element 52 and for gear 56. Shift levers 150 and 152 are mounted externally of the transmission housing on cover plate 92, and they are operatively connected to shifter forks which in turn actuate clutch element 52 and gear 38, respectively. The levers 150 and 152 are mounted adjacent the aforementioned reverse idler shifter fork 120. The levers 150, 152 and 120 are connected mechanically to levers 154, 156 and 158 respectively, the latter levers being formed with suitable eyelets for accommodating the ends of the associated connecting elements. These connecting elements may be in the form of rods 160, 162 and 164 which may be adjustably connected to the ends of levers 150, 152 and 120, respectively.

Levers 154, 156 and 158 are mounted rotatably on a sleeve 166 which forms a portion of the base of the steering column for the vehicle, said sleeve 160 surrounding steering shaft 168. The sleeve 166 is received telescopically over a bearing member 170 which is fixed to a relatively stationary portion of the vehicle chassis. A shift lever mechanism, subsequently to be described, may be used to oscillate sleeve 166 in a longitudinal direction and to rotate the same about the axis of shaft 168. Sleeve 166 carries pins 172 which are adapted to engage selectively recesses or slots 174, 176 and 178, said slots being formed in the hubs for levers 154, 156 and 158, respectively.

When pins 172 assume the position shown in FIGURE 13, they will cause rotary movement of member 158 about the axis of shaft 168 when sleeve 166 is rotated by the gearshift mechanism. In a similar fashion, when pins 172 engage recess 176 in the hub for lever 156, rotary motion of lever 156 takes place when sleeve 166 is rotated by the gearshift mechanism. Also, rotary motion of lever 154 can be effected when pins 172 engage slot 174. When the transmission assumes the neutral condition illustrated in FIGURE 1, the slots 178, 176 and 174 are aligned in a longitudinal direction so that pins 172 may be moved freely from one position to another. However, when pins 172 cause rotation of lever 158, the hub of lever 156 blocks free longitudinal reciprocation of pins 172 and sleeve 166 since the corresponding slots are no longer aligned. This blocking action also occurs when lever 156 is rotated about the axis of shaft 168, and pins 172 and sleeve 166 cannot then be moved in either longitudinal direction when the lever 156 is displaced from the neutral position. This is due to the blocking action of the adjacent lever hubs. In a similar fashion, the hub for lever 156 will block movement of pins 172 and sleeve 166 in a left-hand direction as viewed in FIGURE 13 when lever 154 is rotated from the neutral position.

The base of the steering column is supported by a rubber insulator 180 disposed within an opening in a forward body panel 182. Also, a suitable bracket 184 may surround the bearing member 170 at the base of the steering column for support purposes. A compression spring 186 is situated between a spring seat member 188 at the base of the steering column and the adjacent hub of lever 158. The tension of spring 186 urges the hubs for each of the levers 158, 156 and 154 in a right-hand direction, as viewed in FIGURE 13, and the reaction force is absorbed by means of a thrust washer 190 seated against insulator 180.

The compound motion of the sleeve 166 is obtained by means of a gearshift lever mechanism which includes a tubular shaft 192 connected to sleeve 166. The upper end of tube 192 is piloted on a relatively stationary anchor post 194 at the upper end of the steering column. The hub of the steering wheel is rotatably mounted on post 194 as indicated at 196. Suitable bracket structure may be provided for connecting post 194 to an instrument panel section of the vehicle body.

A column 198 is fixed to the upper end of tube 192 by means of welding and it provides a pivotal support for a gearshift lever 200 which may be controlled by the vehicle operator. One end of the gearshift lever 200 extends beneath the vehicle steering wheel at a convenient location. The inner end of the lever 200 is received within an opening 202 in anchor 194. When lever 200 is rotated about the axis of shaft 168, the column 198 and shaft 192 will rotate in unison by reason of the operation of the leverage formed by lever 200 and column 198. When lever 200 is moved in the plane which contains the axis of shaft 168, shaft 192 and column 198 will be shifted in a longitudinal direction.

Figure 11:
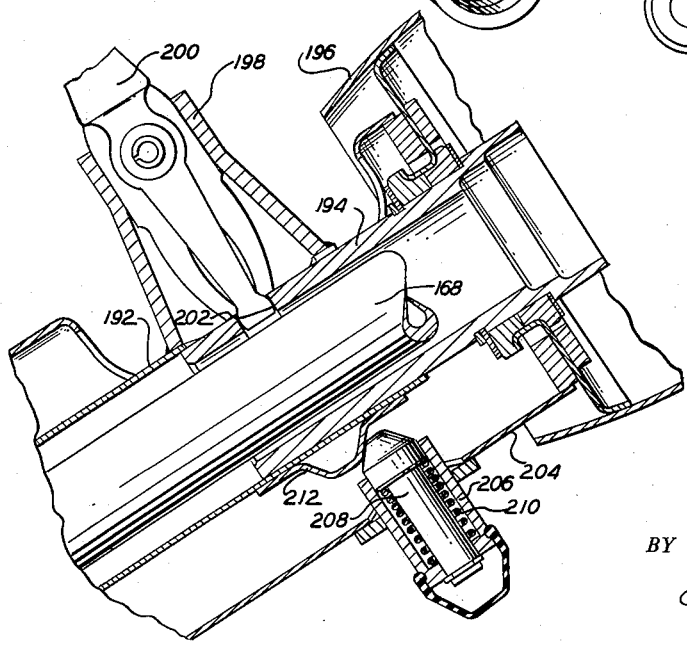
FIGURE 11 is a view of the upper portion of the steering wheel column showing one form of a manually operated gearshift control mechanism for one embodiment of my invention.

As best seen in FIGURE 11, the steering column includes a stationary shroud 204 having an opening within which is received a cylindrical detent element 206. A detent plunger having a tapered detent head is shown at 208 and it is received telescopically within element 206 and urged in a radially inward direction by detent spring 210. The head of plunger 208 contacts a detent cam 212, said cam 212 being secured to the upper end of shaft 192. When shaft 192 is reciprocated toward the top of the steering column, cam 212 will cause plunger 208 to become depressed as the latter rides over the former. This detent action may be sensed readily by the vehicle operator when shifting the transmission mechanism into reverse drive range, and it prevents an inadvertent shifting movement of the linkage mechanism into the reverse drive position during forward driving operation.

Figure 12:
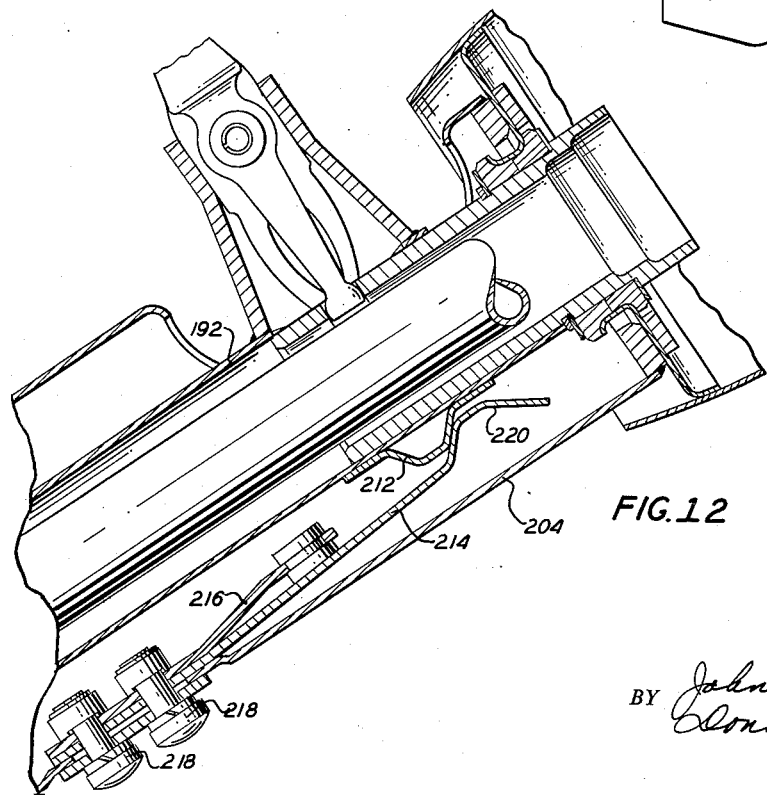
FIGURE 12 is a view similar to FIGURE 11 but it shows another form of gear shifting mechanism.

Referring next to FIGURE 12, I have shown an alternate detent construction for isolating the reverse shift from the shifts which occur during forward drive. This alternate detent construction comprises a pair of leaf springs 214 and 216 which are anchored to relatively stationary shroud 204 by means of bolts 218. The end 220 of the spring 214 is deformed as indicated so that it cooperates with cam 212 to provide a resistance to shifting movement of shaft 192 as the spring end 220 moves over cam 212. Such a camming action takes place when the transmission is conditioned for reverse drive operation.

Figure 6:
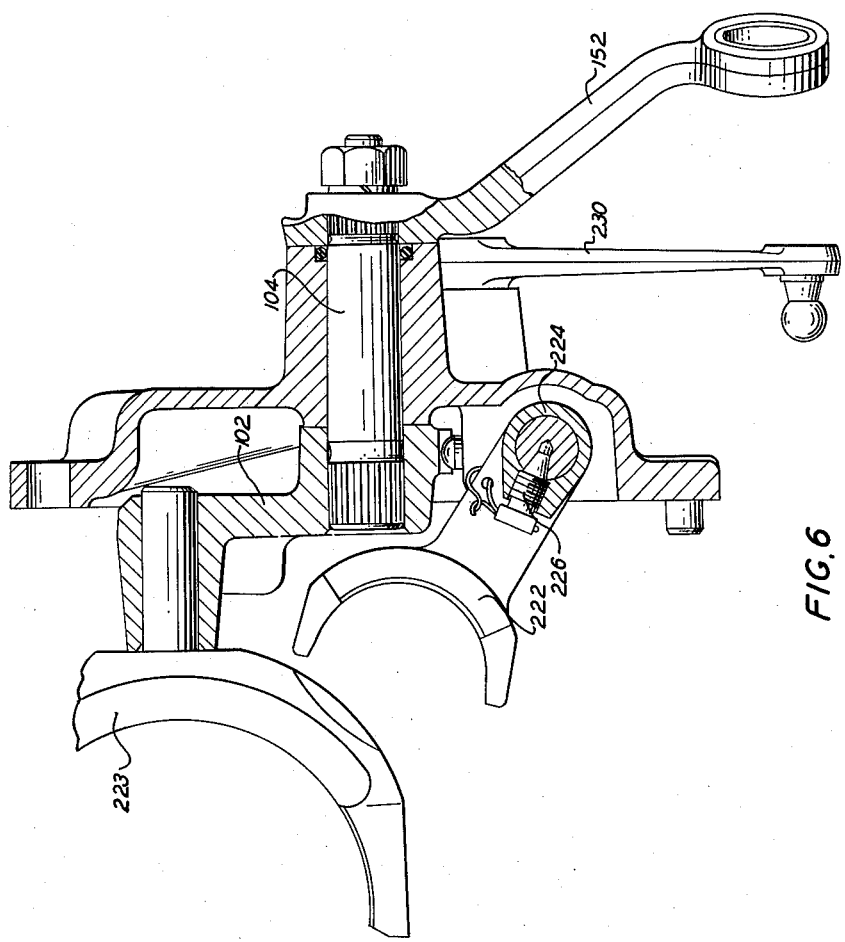
FIGURE 6 is a cross sectional view of a portion of the gear shifting elements shown in FIGURE 5 and is taken along section line 6—6 of FIGURE 5.
Figure 5:
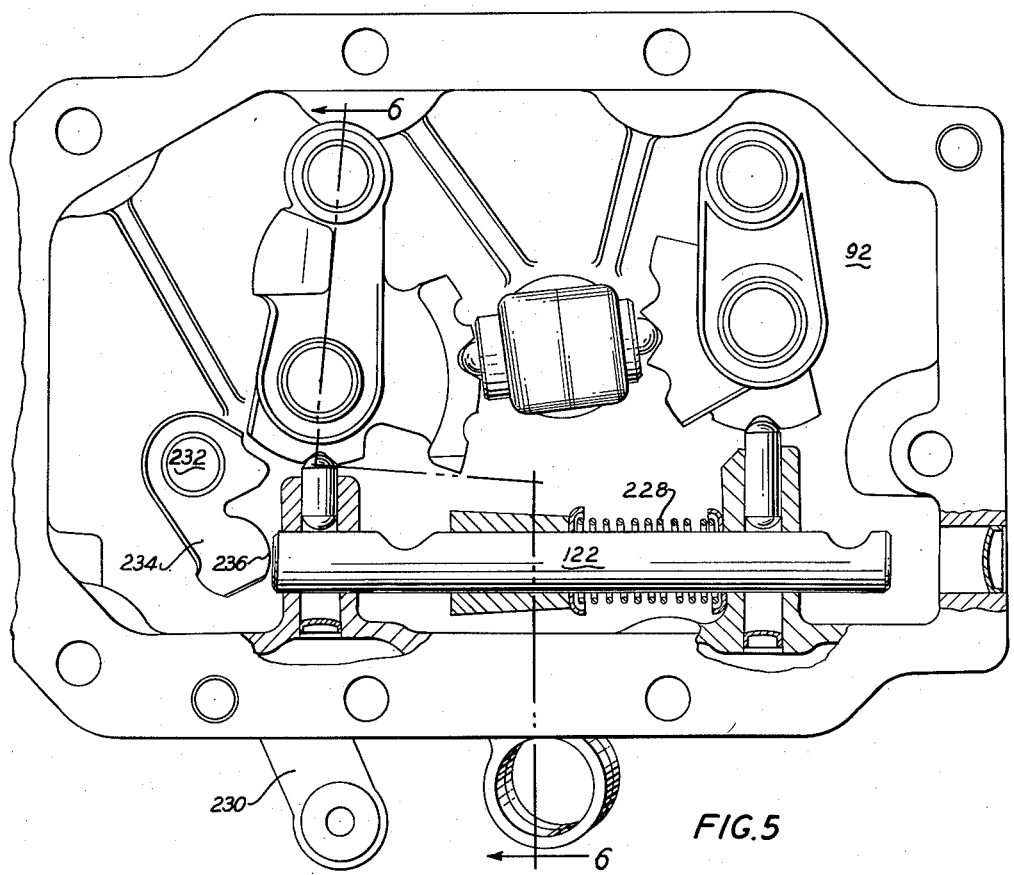
FIGURE 5 is a side elevation view partly in section of a cover plate assembly for a modified form of my invention. This figure shows the interior of the cover plate together with the associated gear shifting elements.
Figure 7:
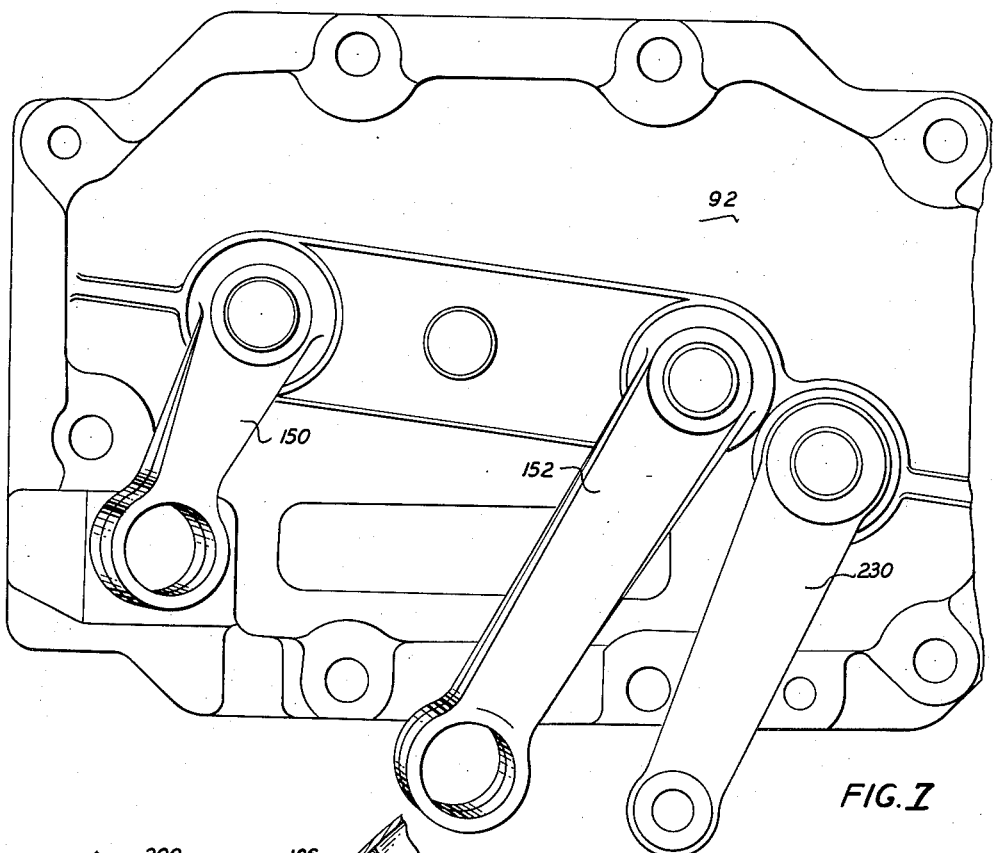
FIGURE 7 is an exterior plan view of the cover plate assembly shown in FIGURE 5.

Referring next to FIGURES 5, 6 and 7, I have shown an alternate means for adjustably positioning shaft 122 to effect a shifting movement of the reverse idler gear. In all other respects the transmission cover plate and linkage mechanism shown in FIGURES 5, 6 and 7 is the same as that previously discussed with reference to FIGURES 3 and 4. However, the spring loaded ball detent for shaft 122 has been eliminated in the FIGURE 5 construction since a detent is provided at another location as will be described subsequently. The first and second speed shifter fork is shown in FIGURE 6 at 223 and it is carried by the aforementioned lever 102.

In the modified construction of FIGURES 5, 6 and 7, the reverse shifter fork is identified by reference character 222 and it includes an arm having an apertured end 224. Shaft 122 is received within the apertured end 224 of fork 222 and a set screw 226 is provided for fixing fork 222 to shaft 122, thereby preventing relative motion therebetween. Shifter fork 222 is urged in a left-hand direction as viewed in FIGURE 5 by means of a spring 228 disposed between boss 128 and the fork end 224.

An external lever 230 is pivoted on the cover plate 92, as indicated in FIGURES 5, 6 and 7, and it is secured to a shaft 232 rotatably journaled in a boss formed on the cover plate 92. The inner end of shaft 232 carries a crank 234 on which is formed a rounded abutment 236, said abutment being engageable with the end of shaft 122. When lever 230 is rotated in a counterclockwise direction, as viewed in FIGURE 5, crank 234 shifts shaft 122 in a right-hand direction against the opposing force of spring 228. This shifting movement of shaft 122 will in turn cause a shifting movement of the reverse idler pinion 80 into a reverse drive position. When shaft 230 is moved in the opposite direction, spring 228 will cause the reverse idler pinion 80 to move out of meshing engagement with gears 68 and 56, thereby conditioning the transmission for a shifting sequence from one forward driving gear ratio to another.

Figure 10:
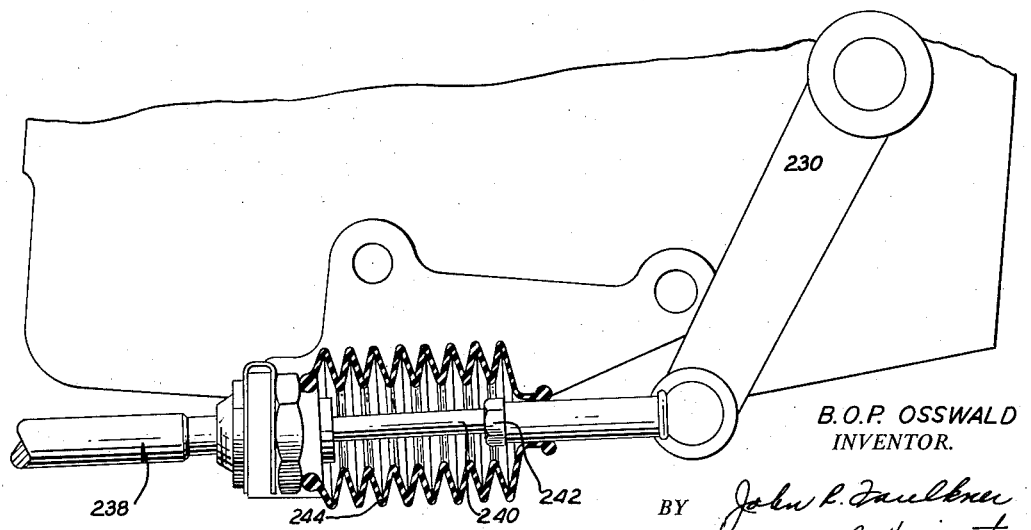
FIGURE 10 is a view of the lower end of the cable mechanism of FIGURES 8 and 9.

In FIGURE 10 I have illustrated a mechanical connection between the end of lever 230 and a push-pull cable generally identified by reference character 238. This connection is adjustable by means of an adjusting bolt 240 and an adjusting nut 242. A rubber boot 244 surrounds the adjustable connection as indicated in order to protect the same.

Figure 8:
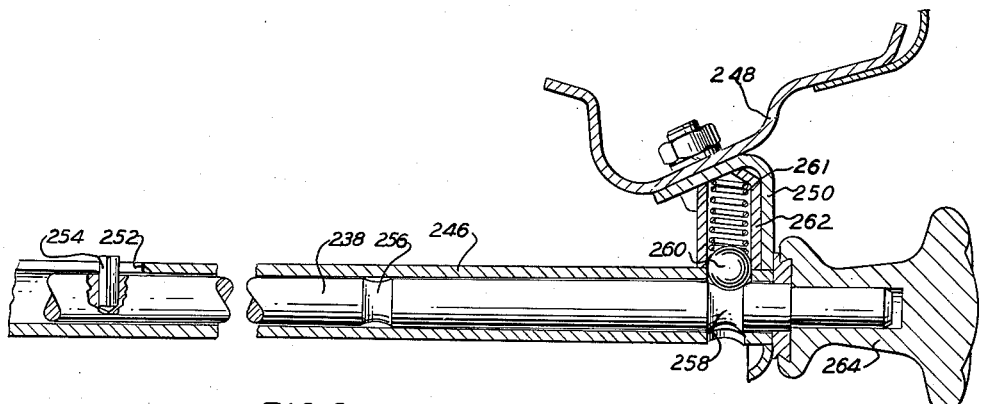
FIGURE 8 is a cross sectional view of a portion of the cable mechanism for actuating the reverse gearshift lever for the cover assembly shown in FIGURES 5 and 6.
Figure 9:
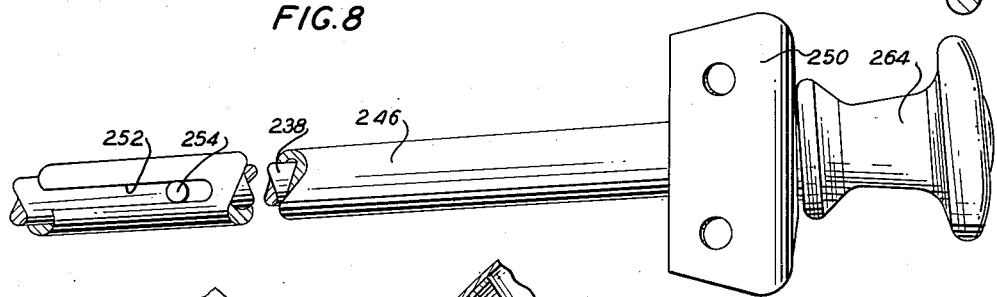
FIGURE 9 is a plan view of the mechanism shown in FIGURE 8.

The push-pull cable 238 extends to the interior of the vehicle passenger compartment and the upper end thereof is slidably received within a sleeve or casing 246 which in turn may be connected to the vehicle dash structure 248 by means of a suitable bracket 250. The upper end of the cable 238 is shown in particular detail in FIGURES 8 and 9. The casing 246 includes a slot 252 within which a guide pin 254 is received, said pin being carried by cable 238. A pair of spaced annular detent recesses is formed in cable 238, as shown at 256 and 258, and a detent ball 260 is adapted to be received in either one or the other of the recesses 258 and 256 as cable 238 is adjusted longitudinally. Ball 260 is urged into the detent recesses by a detent spring 261 which is received in a spring casing 262 carried by bracket 250. A knob or handle 264 is connected to the end of cable 238 to accommodate a manual adjustment of cable 238 to either of the two positions defined by detent recesses 256 or 258. When cable 238 assumes the position shown in FIGURES 8 and 9, the reverse idler pinion will assume a disengaged condtiion since shaft 122 will be urged under the influence of spring 228 in a left-hand direction as viewed in FIGURE 5. The transmission may then be shifted in the usual fashion to any of the four forward driving speed ranges. When cable 238 is pulled by the vehicle operator until detent ball 260 engages recess 256, the reverse idler pinion will resume the reverse driving position and a shifting sequence from one forward driving speed ratio to another will be inhibited.

It is apparent from the foregoing that I have isolated the reverse drive shifting mechanism from the forward drive shifting mechanism. The teachings of my invention may be readily applied to automotive drive lines in current use and the provision of an additional forward speed may be made without serious cost or space penalties.

Having described the principal features of my invention, what I claim and desire to secure by U.S. Letters Patent is:

1. A power transmission mechanism comprising a power input shaft, a power output shaft, a first gear connected to said power input shaft, a mainshaft connected to said power output shaft, said power input shaft, mainshaft and power output shaft being in concentric relationship, second and third gears rotatably journaled on said mainshaft, a cluster gear assembly rotatably journaled for rotation about an axis parallel to the axis of said mainshaft including gear portions separately engageable with said first, second and third gears, synchronizer clutch means for selectively and sequentially locking said first, second and third gears to said mainshaft to establish forward drive speed ratios of progressively varying magnitude, a fourth gear drivably carried by said mainshaft including means for accommodating relative axial movement therebetween, means for shifting said fourth gear into meshing engagement with another gear portion of said cluster gear assembly to establish an additional low speed ratio, a reverse idler pinion mounted for rotation about a third axis parallel to the axis of said mainshaft, means for independently shifting said reverse idler pinion into driving engagement with said fourth gear and said other gear portion to establish reverse drive operation, the clutch means for said second and third gears and the shifting means for said reverse idler pinion including a common driver operated shift lever, a shift column connected to said shift lever and movable thereby both longitudinally and rotatably with respect to the axis of said shift column, independent lever elements connected to the shifting means for said reverse idler pinion and to the clutch means for said second and third gears, coupling means for selectively coupling said lever elements to said shift column when the latter is moved longitudinally to accommodate independent, rotary, gearshifting movement of said lever elements upon rotation of said shift column, and a detent mechanism including engageable detent parts, one detent part being carried by said shift column and the other being relatively stationary, said detent mechanism providing a resistance to longitudinal shifting movement of said shift column to an idler pinion reverse driving position.

2. A power transmission mechanism comprising a power input shaft, a power output shaft, a first gear connected to said power input shaft, a mainshaft connected to said power output shaft, said power input shaft, mainshaft and power output shaft being in concentric relationship, second and third gears rotatably journaled on said mainshaft, a cluster gear assembly rotatably journaled for rotation about an axis parallel to the axis of said mainshaft including gear portions separately engageable with said first, second and third gears, synchronizer clutch means for selectively and sequentially locking said first, second and third gears to said mainshaft to establish forward drive speed ratios of progressively varying magnitude, a fourth gear drivably carried by said mainshaft including means for accommodating relative axial movement therebetween, means for shifting said fourth gear into meshing engagement with another gear portion of said cluster gear assembly to establish an additional low speed ratio, a reverse idler pinion mounted for rotation about a third axis parallel to the axis of said mainshaft, and means for independently shifting said reverse idler pinion into driving engagement with said fourth gear and said other gear portion to establish reverse drive operation, the shifting means for said reverse idler pinion comprising a personally operable shiftable member mechanically connected to said reverse idler pinion, a first interlock means for inhibiting simultaneous operation of the shifting means for said fourth gear and said synchronizer clutch means, and second interlock means for inhibiting simultaneous operation of said reverse idler pinion shifting means and said fourth gear shifting means and for inhibiting simultaneous operation of said reverse idler pinion shifting means and said synchronizer clutch means, said second interlock means being defined in part by said personally operable shiftable member, and separate interlock elements engageable with said personally operable shiftable member and actuated thereby into the path of movement of movable portions of said synchronizer clutch means and said first interlock means.

3. A power transmission mechanism comprising a power input shaft, a power output shaft, a first gear connected to said power input shaft, a mainshaft connected to said power output shaft, said power input shaft, mainshaft and power output shaft being in concentric relationship, second and third gears rotatably journaled on said mainshaft, a cluster gear assembly rotatably journaled for rotation about an axis parallel to the axis of said mainshaft including gear portions separately engageable with said first, second and third gears, synchronizer clutch means for selectively and sequentially locking said first, second and third gears to said mainshaft to establish forward drive speed ratios of progressively varying magnitude, a fourth gear drivably carried by said mainshaft including means for accommodating relative axial movement therebetween, means for shifting said fourth gear into meshing engagement with another gear portion of said cluster gear assembly to establish an additional low speed ratio, a reverse idler pinion mounted for rotation about a third axis parallel to the axis of said mainshaft, means for independently shifting said reverse idler pinion into driving engagement with said fourth gear and said additional gear portion to establish reverse drive operation, the shifting means for said reverse idler pinion comprising a push-pull member mechanically connected to said reverse idler pinion, one end of said push-pull member having a manually engageable part, a shifter shaft connected to and movable with said reverse idler pinion, spring means for urging said shifter shaft toward a reverse idler pinion disengaging position, and motion transmitting means connected to said push-pull member for shifting said lastnamed shaft toward a reverse idler pinion engaging position against spring pressure.

4. The combination as set forth in claim 2 wherein said push-pull member includes a detent mechanism defining two separate operating positions for said push-pull member, one position corresponding to a disengaged condition of said reverse idler pinion and the other corresponding to an engaged condition of the same.

5. A power transmission mechanism comprising a power input shaft, a power output shaft, a first gear connected to said power input shaft, a mainshaft connected to said power output shaft, said power input shaft, mainshaft and power output shaft being in concentric relationship, second and third gears rotatably journaled on said mainshaft, a cluster gear assembly rotatably journaled for rotation about an axis parallel to the axis of said mainshaft including gear portions separately engageable with said first, second and third gears, synchronizer clutch means for selectively and sequentially locking said first, second and third gears to said mainshaft to establish forward drive speed ratios of progressively varying magnitude, a fourth gear drivably carried by said mainshaft including means for accommodating relative axial movement therebetween, means for shifting said fourth gear into meshing engagement with another gear portion of said cluster gear assembly to establish an additional low speed ratio, a reverse idler pinion mounted for rotation about a third axis parallel to the axis of said mainshaft, means for independently shifting said reverse idler pinion into driving engagement with said fourth gear and said other gear portion to establish reverse drive operation, the clutch means for said second and third gears and the shifting means for said reverse idler pinion including a driver operated shiftable member, independent shifting elements connected to the shifting means for said reverse idler pinion and to the clutch means for said first and second gears, means for inhibiting the operation of the clutch means for said second and third gears in response to movement of the shifting means for said reverse idler pinion, said inhibiting means being defined in part by said driver operated shiftable member, and a detent mechanism including engageable detent parts, one detent part being connected to said driver operated shiftable member and the other being relatively stationary, said detent mechanism providing a resistance to movement of said shiftable member to a reverse driving position.

References Cited in the file of this patent

UNITED STATES PATENTS

| | | |
|---|---|---|
| 2,273,068 | Ross et al. | Feb. 17, 1942 |
| 2,333,161 | Dunn | Nov. 2, 1943 |
| 2,403,378 | Kilpela | July 2, 1946 |
| 2,511,539 | Orr | June 13, 1950 |
| 2,512,036 | Orr | June 20, 1950 |